United States Patent [19]

Yamashita et al.

[11] Patent Number: 4,871,230

[45] Date of Patent: Oct. 3, 1989

[54] SINGLE MODE PHOSPHATE LASER GLASS FIBER

[75] Inventors: Toshiharu Yamashita; Sho Amano, both of Hachioji; Hidemi Tajima, Hamura; Isao Masuda, Nakano; Tetsuro Izumitani, Hino, all of Japan

[73] Assignee: Hoya Corporation, Tokyo, Japan

[21] Appl. No.: 211,056

[22] Filed: Jun. 24, 1988

[30] Foreign Application Priority Data

Jun. 24, 1987 [JP]   Japan .................................. 62-157416

[51] Int. Cl.$^4$ .............................................. G02B 6/16
[52] U.S. Cl. .............................. 350/96.34; 350/96.29; 350/96.3

[58] Field of Search .................. 350/96.34, 96.29, 96.3

[56] References Cited

U.S. PATENT DOCUMENTS 4,330,629   5/1982   Hing et al. ......................... 501/48 X
4,333,848   6/1982   Myers et al. ....................... 501/45 X Primary Examiner—John D. Lee
Assistant Examiner—John Ngo
Attorney, Agent, or Firm—Nixon & Vanderhye

[57] ABSTRACT

A single mode laser glass fiber showing excellent laser oscillation characteristics even at a short fiber length can be efficiently obtained using a phosphate laser glass with excellent laser characteristics.

4 Claims, 2 Drawing Sheets

SINGLE MODE PHOSPHATE LASER GLASS FIBER

BACKGROUND OF THE INVENTION

1. Field of the Invention

The present invention relates to a single mode phosphate laser glass fiber. The single mode laser glass fiber according to the present invention is suited for use as a light source for fiber systems such as fiber optic communication, fiber optic measurement and the like.

2. Description of the Prior Art

As a single mode laser glass fiber, there is already known a single mode silica laser fiber obtained by adding a rare earth element as a laser active ion to a silica glass, as seen in pages 738–740 of Electronics Letters 15th Aug. 1985 Vol. 21 No. 17. A fiber laser oscillator using such a single mode silica laser fiber comprises (a) the silica fiber and (b) dichroic mirrors provided at the both ends of the silica laser fiber, which dichroic mirrors transmit a pumping light and have a reflectivity against a lasing light. The laser fiber is end-pumped with a pumping light emitted from a laser source such as laser diode, argon laser or the like.

A single mode glass fiber can be made easily utilizing the forming ability of a glass and can confine a light in its narrow fiber core to generate a high power density. Consequently, their laser oscillation threshold is very low. Further, owing to the end-pumping by selective wavelength, the glass fiber lasers operate at a high efficiency. The very low oscillation threshold and high efficiency operation are advantageous because a higher output can be obtained from a given input. Moreover, by being made into a fiber form, they have a large surface-area-to-volume ratio; therefore, can give a high cooling efficiency; and as a result, can provide long-term and stable operation without requiring any cooling device. Furthermore, since their connection with other fibers is easy, the glass fiber lasers are suitable as a tunable laser source of high output in fiber systems.

However, single mode silica glass fiber lasers, containing a laser active ion in a small amount of less than 900 ppm and being made of a silica laser glass, have a small stimulated emission cross section and give a small gain per unit length. Meanwhile, pages 198–199 of Electronics Letters 13th Feb. 1986 Vol. 22 No. 4 describes that by utilizing the low loss of silica glass fiber and employing a longer fiber length, there could be obtained a silica laser fiber giving a higher gain and having laser characteristics of laser oscillation threshold=2.6 mW and slope efficiency=33% at a fiber length of 3.2 m.

As mentioned above, the conventional single mode silica glass fiber lasers have needed the use of a long fiber length in order to obtain good oscillation characteristics. It is because these fiber lasers can not contain the laser active ion in an increased amount, the laser material has a small stimulated emission cross section and thus the lasers have poor laser characteristics.

In contrast, phosphate laser glasses, as compared with the silica laser glasses, have good laser characteristics but have a large coefficient of thermal expansion and show a sharp viscosity change with the change of temperature, making fiber drawing difficult. Therefore, there is known no case in which any phosphate laser glass has been made into a fiber.

SUMMARY OF THE INVENTION

The object of the present invention is to solve the above-mentioned problems and to efficiently obtain a laser glass fiber showing excellent laser oscillation even at a short fiber length, from a phosphate laser glass with excellent laser characteristics.

The present invention made investigation in order to achieve the above object and, as a result, found the following matters.

(1) A single mode phosphate laser glass fiber gives a high gain per unit fiber length and accordingly shows excellent laser oscillation even at a short fiber length; said single mode phosphate laser glass comprising (a) a core glass consisting of a phosphate glass which has a larger stimulated emission cross section than silica glasses, can contain a laser active ion in a high concentration and at that time cause less concentration quenching of fluorescence, accordingly gives a high gain, and thus has excellent laser characteristics and (b) a clad glass for the core glass, consisting of a phosphate glass having a lower refractive index than the phosphate glass (a).

(2) A phosphate laser glass can be formed into a fiber by using, as the clad glass, a phosphate glass whose thermal properties (coefficient of linear thermal expansion, transition temperature, viscosity) are close to those of the core glass consisting of the phosphate laser glass, whereby a phosphate laser glass fiber which is long and has good optical properties can be mass-produced.

Based on these findings, the present invention has been completed.

The present invention provides a laser glass fiber which comprises (a) a phosphate glass as a core glass, containing 45–70% (in terms of mole) of $P_2O_5$, 4–20% of $Al_2O_3$, 0–35% of $R''O$ ($R''O$ refers to at least one member selected from the group consisting of MgO, CaO, BaO, PbO, SrO and ZnO; the same applies hereinafter), 0–30% of $R'_2O$ ($R'_2O$ refers to at least one member selected from the group consisting of $Li_2O$, $Na_2O$ and $K_2O$; the same applies hereinafter) (the sum of $R''O$ and $R'_2O$ is 4–45%) and 0.1–6% of $Nd_2O_3$ and (b) a phosphate glass as a clad glass for the core glass, having a refractive index lower than that of the core glass and containing 45–70% (in terms of mole) of $P_2O_5$, 4–20% of $Al_2O_3$, 0–35% of $R''O$ and 0–30% of $R'_2O$ (the sum of $R''O$ and $R'_2O$ is 4–45%); said laser glass fiber giving single mode oscillation at a lasing wavelength of 1.054 μm.

In the above laser glass fiber, the core glass may contain, in addition to said essential components, 20% or below of $SiO_2$ and/or 15% or below of at least one member selected from the group consisting of $Y_2O_3$, $La_2O_3$, $TiO_2$, $ZrO_2$, $Nb_2O_5$ and $Ta_2O_5$, as optional components.

The clad glass may contain, in addition to said essential components, at least one member selected from the group consisting of 20% or below of $SiO_2$; 5% or below of at least one metal oxide selected from the group consisting of $Y_2O_3$, $La_2O_3$, $TiO_2$, $ZrO_2$, $Nb_2O_5$ and $Ta_2O_5$; and 13% or below of $B_2O_3$, as optional components.

DETAILED DESCRIPTION OF THE INVENTION

Figure 1:
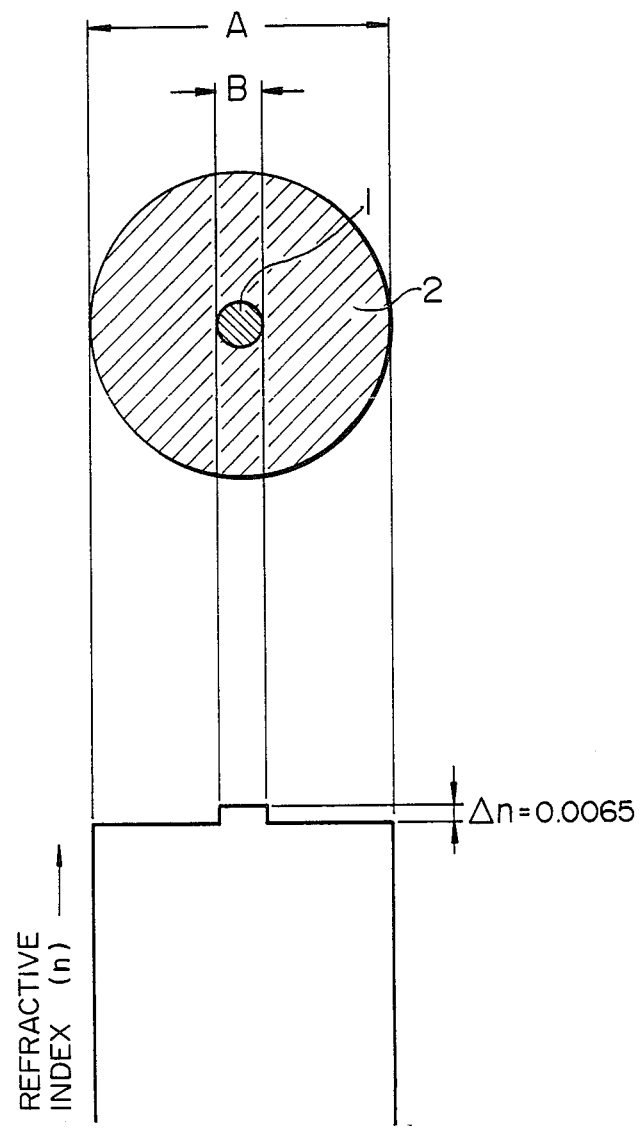
FIG. 1 is a drawing showing the cross-sectional structure and refractive index distribution of the single mode laser glass fiber of Example 1 of the present invention.

The single mode phosphate laser glass fiber of the present invention includes the following four fibers as preferable embodiments.

Fiber I

The core glass and the clad glass each consist of the following essential components of the following amounts.

|  | Core glass | Clad glass |
| --- | --- | --- |
| $P_2O_5$ | 45–70% | 45–70% |
| $Al_2O_3$ | 4–20% | 4–20% |
| $R''O$ | 0–35% | 0–35% |
| $R'_2O$ | 0–30% | 0–30% |
| $R''O + R'_2O$ | 4–45% | 4–45% |
| $Nd_2O_3$ | 0.1–6% | — |

Fiber II

The composition of the clad glass is included in the composition of the clad glass of the fiber I. The core glass is obtained by adding to the composition of the core glass of the fiber I at least one member selected from the following components (1) and (2a), in the following amounts.

(1) $SiO_2$ in an amount of 20% or below.

(2a) At least one metal oxide selected from the group consisting of $Y_2O_3$, $La_2O_3$, $TiO_2$, $ZrO_2$, $Nb_2O_5$ and $Ta_2O_5$ in a total amount of 15% or below.

Fiber III

The composition of the core glass is included in the composition of the core glass of the fiber I. The clad glass is obtained by adding to the composition of the clad glass of the fiber I at least one member selected from the following components (1), (2b) and (3), in the following amounts.

(1) $SiO_2$ in an amount of 20% or below.

(2b) At least one metal oxide selected from the group consisting of $Y_2O_3$, $La_2O_3$, $TiO_2$, $ZrO_2$, $Nb_2O_5$ and $Ta_2O_5$ in a total amount of 5% or below.

(3) $B_2O_3$ in an amount of 13% or below.

Fiber IV

The composition of the core glass is included in the composition of the core glass of the fiber II, and the composition of the clad glass is included in the composition of the clad glass of the fiber III. That is, the core glass is obtained by adding to the composition of the core glass of the fiber I at least one member selected from the components (1) and (2a), in the amounts shown above; and the clad glass is obtained by adding to the composition of the clad glass of the fiber I at least one member selected from the components (1), (2b) and (3), in the amounts shown above.

Next, there are explained the reasons for the above amount range specified for each component of the phosphate core glass and the phosphate clad glass used in the single mode phosphate laser glass fiber of the present invention.

The amount range of each glass component should be determined so as to provide sufficient laser characteristics, stability against crystallization in fiber drawing, and chemical durability and mechanical properties required in practical use of fiber. When $P_2O_5$, the essentail component in both the core glass and the clad glass, is contained in each of these glasses in an amount less than 45%, the resulting glass has no excellent laser characteristics and further has poor chemical durability, particularly poor acid resistance. In general, the higher the $P_2O_5$ concentration, the better the laser characteristics. When the $P_2O_5$ amount exceeds 70%, the resulting glass is devitrified easily and has poor chemical durability. Accordingly, the $P_2O_5$ amount is limited to a range of 45–70%.

$Al_2O_3$ used as the essential component in both the core glass and the clad glass is a component for providing good chemical durability and is required in an amount of at least 4%. However, when the amount exceeds 20%, the resulting glass is devitrified easily. Accordingly, the $Al_2O_3$ amount is limited to a range of 4–20%.

$SiO_2$ used as the optional component in both the core glass and the clad glass is a component for increasing the strength of the glass. When the $SiO_2$ amount excess 20%, the resulting glass has reduced laser characteristics and poor chemical durability. Accoridngly, when $SiO_2$ is used, the amount is desirably 20% or below.

$B_2O_3$ has an action of inhibiting the devitrification of glass and reducing its refractive index. Therefore, it can be used in the clad glass in an amount of 13% or below. When the $B_2O_3$ exceeds 13%, the resulting glass tends to be devitrified; therefore, when $B_2O_3$ is used, the amount is desirably 13% or below. If $B_2O_3$ is used in the core glass, it increases the probability of multi-phonon relaxation and, as a result, increases the proportion of non-radiative transition and shortens the fluorescence life time. Therefore, $B_2O_3$ should not be used in the core glass.

$R''O$ (at least one member selected from the group consisting of MgO, CaO, BaO, PbO, SrO and ZnO) and $R'_2O$ (at least one member selected from the group consisting of $Li_2O$, $Na_2O$ and $K_2O$) are used in both the core glass and the clad glass as glass modifier components. When their total amount is less than 4%, no stable glass can be obtained. When the total amount is more than 45%, the resulting glass has poor laser characteristics, reduced chemical durability and increased refractive index. Therefore, the total amount is limited to a range of 4–45%. When the $R''O$ amount exceeds 35% and the $R'_2O$ amount exceeds 30%, the resulting glass has reduced laser characteristics and chemical durability. Accordingly, the $R''O$ amount is limited to 0–35% and the $R'_2O$ amount is limited to 0–30%.

$Nd_2O_3$ is a laser active ion and is essential in the core glass. In order to achieve the shortening of fiber length (this allows production of a small-sized oscillator), $Nd_2O_3$ is required in an amount of at least 0.1%. However, when the $Nd_2O_3$ amount is more than 6%, the resulting glass has reduced laser characteristics. Therefore, the $Nd_2O_3$ amount in the core glass is limited to 0.1–6%.

At least one member selected form the group consisting of $Y_2O_3$, $La_2O_3$, $TiO_2$, $ZrO_2$, $Nb_2O_5$ and $Ta_2O_5$ has an effect of providing increased chemical durability and mechanical properties and accordingly can be used as optional components in the core glass in an amount of 15% or below. When they are used in an amount more than that, the resulting glass has a low fluorescence intensity and is devitrified easily. Therefore, when they are used in the core glass, the amount is desirably 15% or below. When they are used in the clad glass, the amount is desirably 5% or below.

In the single mode phosphate laser glass fiber of the present invention, the core glass and the clad glass can contain components other than those mentioned above, such as rare earth element oxides (e.g. CeO) in an amount of, for example, 1% or below.

In the laser fiber glass of the present invention, if is necessary that the clad glass has a lower refractive index than the core glass. This requirement can be met even when both of the core glass and the clad glass are constituted by the essential components alone, becuase the core glass always contains $Nd_2O_3$ and the clad glass contains no $Nd_2O_3$. The refractive index of the clad glass lower than that of the core glass can be achieved also by, for example, the following approaches.

(a) The total amount of $P_2O_5$ and $Al_2O_3$ is increased.
(b) The amount of MgO is increased.
(c) The amount of $K_2O$ is increased.
(d) $SiO_2$ is replaced by $Al_2O_3$ and MgO in the core glass.

The cladding of the core glass with clad glass is effected by, as described in Examples shown laser, processing a laser glass material for core and a glass material for clad into a rod form and a pipe form, respectively, then inserting the rod into the pipe, and subjecting them to fiber drawing in a drawing furnace.

The phosphate laser glass fiber of the present invention is characterized by giving single mode oscillation at a lasing wavelength of 1.054 μm. In order to obtain a single mode fiber, the fiber dimension and the fiber materials must be selected so as to satisfy the following well known formula:

$$2\pi a/\lambda(n_1^2-n_2^2)^{\frac{1}{2}} < 2.405$$

[in the above formula, a is a core radius; $\lambda$ is a wavelength; $n_1$ is a refractive index of the core glass; $n_2$ is a refractive index of the clad glass; 2.405 is a constant and the first root of the zero order Bessel function]. The single mode fiber requirement represented by the above formula is satisfied by making the diameter of the core glass about several microns in order to make large the power density in the core glass for a low oscillation threshold and high efficiency operation, whereby there can be obtained a high performance laser of good spacial beam quality.

The both ends of the laser fiber are subjected to optical polishing and then each provided with a dichroic mirror having a desired reflectivity against a lasing light and transmitting a pumping light, whereby a laser resonator is obtained. As the laser resonator, there are considered two types, i.e. an external-mirror type obtained by attaching a mirror to each fiber end and an internal-mirror type obtained by forming a mirror directly on each fiber end by vapor deposition. Of these, the internal-mirror type is preferred in view of the degree of coupling loss between fiber end and mirror, the easiness of mirror adjustment and the size of resonator obtained (a smaller size is preferable).

The light source for pumping can be any laser source (e.g. an argon laser) as long as the spectra of the light source are identical with the absorption spectra of the fiber laser. However, a laser diode is preferable because it can provide a resonator of smaller size. The reason is as follows.

In the laser pumping method, the spectra of a pumping light can be utilized efficiently and most of the spectra can be applied to a laser medium. Further in the laser pumping method, end-pumping is possible, resulting in increased absorption efficiency.

Meanwhile in the lamp pumping method, the spectra emitted by a lamp have a width and do not well coincide with the absorption spectra of a laser medium. Hence, the spectra of the lamp light are not utilized efficiently. Moreover, the lamp light is an incoherent light, making it difficult to completely converge the light at the laser medium.

For the reasons mentioned above, the laser resonator according to the present invention can operate at a higher efficiency in the laser pumping method than in the lamp pumping method. Hence, in the present laser resonator, it is desirable to use a laser, particularly laser diode as the light source for pumping.

Generally in end-pumping, a laser fiber must have such a length so as to allow sufficient absorption of a pumping light and to provide sufficient gain in oscillation. Meanwhile, the amount of pumping light abosrbed by laser fiber varies depending upon the wavelength of pumping light and the concentration of laser active ion. Therefore, the length of any laser fiber must be determined by taking these factors into consideration. In the laser fiber of the present invention, since the concentration of laser active ion can be set high, the most part of the pumping light can be absorbed even by a fiber of short length if the pumping light has a wavelength close to the peak of the abosrption spectra of the laser active ion. Further in the present laser fiber, the concentration quenching of fluorescence is unlikely to occur at a high concentration of the laser active ion, making it possible to obtain a large gain per unit length of laser fiber. Therefore, the present laser fiber shows excellent oscillation characteristics even at a short fiber length. Further, even when containing a low concentration of a laser active ion and being pumped by a wavelength slightly deviating from the absorption spectra of the laser active ion, the present laser fiber is usable if it has a long fiber length.

The present invention is described in more detail below by way of Examples. However, the present invention is in no way restricted to these Examples.

EXAMPLE 1

To begin with, the production of a fiber and its properties are described. A raw material mixture for core glass and a raw material mixture for clad glass, each having a composition as shown in the column of Example 1 of Table 1 were each placed in a 2-liter platinum pot and melted at 1,250°–1,300° C. Each melt was poured into a mold to form a plate of about 50 mm in thickness and then cooled slowly. Each plate was cut into a desired size. The laser glass for core was polished to obtain a rod of 1.67 mm in diameter and 53.5 mm in length, and the glass for clad was polished to obtain a pipe of 27.2 mm in outside diameter, 1.68 mm in inside diameter and 53.5 mm in length. The rod was inserted into the pipe and they were set in a drawing furnace. When they were heated to 660° C., there were effected fiber drawing at a drawing speed of 65 m/min and winding around a drum to obtain a fiber. The drawing operation was smooth and a long fiber having a length of about 1,000 m was obtained.

This fiber, as shown in FIG. 1, consisted of a core glass 1 and a clad glass 2 and, as shown in Table 1, had dimensions of fiber diameter A=65 μm and core diameter B=4 μm, a core glass refractive index of 1.523 and a refractive index distribution of refractive index difference between core and clad=0.0065.

The stimulated emission cross section and the fluorescence life time of the core glass are $4.2\times10^{-20}$ cm$^2$ and 315 μsec, respectively, as seen in Table 1. The stimulated emission cross section is larger than that (about $2\times10^{-20}$ cm$^2$) of the silica laser glass. With respect to the fluorescence life time, the concentration quenching of fluorescence (of the core glass) is small even though it is doped with a high concentration of a laser active ion, and the fluorescence life time is longer than that (about 250 μsec) of the silica laser glass doped with about the same amount of the laser active ion.

Figure 2:
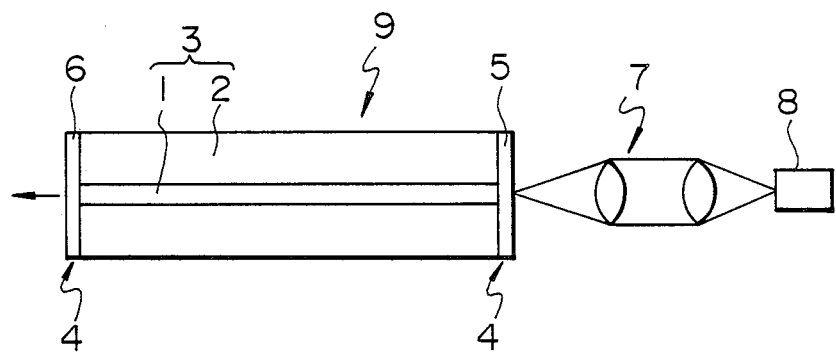
FIG. 2 is a schematic drawing of a laser oscillator using the single mode laser glass fiber of Example 1 of the present invention.

Next, there are described a fiber laser oscillator using the above fiber as well as the laser oscillation characteristics obtained with the oscillator. FIG. 2 shows a laser oscillator used in this Example. In FIG. 2, a single mode fiber 3 is constituted by a core 1 (which is a laser medium) and a clad 2 surrounding the core 1, and has a total length of 10 mm. The both ends of the fiber are subjected to optical polishing and provided with dichroic mirrors 4 transmitting a pumping light and reflecting a lasing light. The fiber and the dichroic mirrors form a laser resonator 9 of Fabry-Perot type. The dichroic mirrors 4 consist of a rear mirror 5 which transmits at least 90% of a pumping light (a laser diode light of 807 nm in this Example) and totally reflects a light having a lasing wavelength of 1.054 μm, and a front mirror 6 for taking out an output, which transmits at least 90% of the pumping light and has a reflectivity of 70% against the lasing wavelength. A laser diode (LTO 15 MF manufactured by Sharp Corp.) is used as a pumping source 8. The light emitted from the laser diode has a lasing wavelength of 807 nm and is converged at the core end of the fiber by an optical system 7. Stable single mode continuous wave oscillation of 0.6 mW was obtained aginst the absorbed input power of 2.2 mW. At that time, there was obtained an operation of low threshold (laser oscillation threshold=1 mW) and high efficiency (slope efficiency=50%). These values were obtained using a laser glass fiber having a fiber length of 10 mm. When considering that the conventional silica glass fiber gives an oscillation threshold of 2.6 mW and a slope efficiency of 33% at a fiber length of 3.2 m (see the above-mentioned Electronics Letters), the laser glass fiber of the present invention apparently has excellent laser characteristics.

EXAMPLES 2-17

Using the core glasses and clad glasses having the compositions shown in Table 1, the fibers of Examples 2-17 were produced in the same manner as in Example 1.

The fiber diameter, core diameter, refractive index of core glass, stimulated emission cross section of core glass, fluorescence life time, etc. of each fiber are shown in Table 1.

With respect to the laser oscillation characteristics, the above fibers gave stable continuous wave oscillation of low threshold (oscillation threshold=2 mW or below) and high efficiency (slope efficiency=30% or above) at a fiber length of 0.3-25 mm, although these values varied depending upon the amount of $Nd_2O_3$ doped, the pumping wavelength, the tramsmittance of a front mirror, etc.

TABLE 1

| | | | Examples | | | | | | | | | | |
|---|---|---|---|---|---|---|---|---|---|---|---|---|---|
| | | | 1 | | 2 | | 3 | | 4 | | 5 | | 6 | |
| | | | Core glass | Clad glass | Core glass | Clad glass | Core glass | Clad glass | Core glass | Clad glass | Core glass | Clad glass | Core glass | Clad glass |
| | $P_2O_5$ | (mole %) | 60.0 | 60.7 | 56.5 | 55.0 | 65.0 | 65.3 | 56.0 | 55.0 | 60.0 | 60.2 | 62.0 | 61.2 |
| | $Al_2O_3$ | (mole %) | 8.1 | 8.2 | 8.0 | 8.5 | 7.0 | 7.1 | 9.0 | 8.5 | 5.0 | 5.5 | 10.0 | 9.3 |
| | $SiO_2$ | (mole %) | — | — | — | — | — | — | — | — | 20.0 | 20.0 | — | — |
| | $B_2O_3$ | (mole %) | — | — | — | — | — | — | — | 2.0 | — | — | — | — |
| | $Li_2O$ | (mole %) | — | — | — | — | 10.0 | 10.1 | 2.0 | 2.0 | 11.0 | 11.0 | 5.0 | 5.0 |
| R'$_2$O | $Na_2O$ | (mole %) | — | — | — | — | 6.0 | 6.1 | — | — | — | — | 6.0 | 6.0 |
| | $K_2O$ | (mole %) | 16.4 | 16.6 | 17.0 | 17.0 | — | — | 15.0 | 15.0 | — | — | — | — |
| | MgO | (mole %) | 2.0 | 2.0 | 2.0 | 2.0 | — | — | — | — | — | — | — | — |
| | CaO | (mole %) | — | — | — | — | 7.0 | 7.1 | — | — | — | — | 12.0 | 12.5 |
| R"O | BaO | (mole %) | 12.0 | 12.1 | 12.5 | 13.0 | — | — | 4.5 | 4.0 | — | — | — | — |
| | PbO | (mole %) | — | — | — | — | — | 0.5 | 9.5 | 9.5 | — | — | — | — |
| | SrO | (mole %) | — | — | — | — | — | — | — | — | — | — | — | — |
| | ZnO | (mole %) | — | — | — | — | — | — | — | — | — | — | — | — |
| | $Nd_2O_3$ | (mole %) | 1.1 | — | 3.5 | — | 1.2 | — | 3.5 | — | 4.0 | — | 3.0 | — |
| | $Y_2O_3$ | (mole %) | — | — | — | 4.0 | 3.0 | 3.0 | — | — | — | — | 4.0 | — |
| | $TiO_2$ | (mole %) | — | — | — | — | — | — | — | — | 0.1 | — | — | — |
| | $Nb_2O_5$ | (mole %) | 0.4 | 0.4 | 0.5 | 0.5 | 0.8 | 0.8 | 0.5 | 0.5 | — | — | 2.0 | 2.0 |
| | $La_2O_3$ | (mole %) | — | — | — | — | — | — | 3.5 | — | 3.3 | — | — | — |
| | $ZrO_2$ | (mole %) | — | — | — | — | — | — | — | — | — | — | — | — |
| | $Ta_2O_5$ | (mole %) | — | — | — | — | — | — | — | — | — | — | — | — |
| | R'$_2$O | (mole %) | 16.4 | 16.6 | 17.0 | 17.0 | 16.0 | 16.2 | 17.0 | 17.0 | 11.0 | 11.0 | 11.0 | 11.0 |
| | R"O | (mole %) | 14.0 | 14.1 | 14.5 | 15.0 | 7.0 | 7.6 | 14.0 | 13.5 | — | — | 12.0 | 12.5 |
| | R"O + R'$_2$O | (mole %) | 30.4 | 30.7 | 31.5 | 32.0 | 23.0 | 23.8 | 31.0 | 30.5 | 11.0 | 11.0 | 23.0 | 23.5 |
| Stimulated emission cross section ($10^{-20}$ cm$^2$) | | | 4.2 | — | 4.2 | — | 4.1 | — | 4.0 | — | 3.9 | — | 4.0 | — |
| Fluorescence life time (μsec) | | | 315 | — | 200 | — | 290 | — | 190 | — | 200 | — | 190 | — |
| Fiber diameter (μm) | | | 65 | | 85 | | 120 | | 123 | | 125 | | 100 | |
| Core diameter (μm) | | | 4 | | 10 | | 6 | | 10 | | 4 | | 8 | |
| Core glass refractive index | | | 1.523 | | 1.542 | | 1.541 | | 1.591 | | 1.540 | | 1.545 | |
| Numerical aperture | | | 0.141 | | 0.075 | | 0.095 | | 0.068 | | 0.126 | | 0.099 | |
| Normalized frequency (1.054 μm) | | | 1.67 | | 2.24 | | 1.70 | | 2.03 | | 1.50 | | 2.35 | |

| | Examples | | | | | |
|---|---|---|---|---|---|---|
| | 1 | 2 | 3 | 4 | 5 | 6 |
| | Core Clad | Core Clad | Core Clad | Core Clad | Core Clad | Core Clad |

TABLE 1-continued

|  |  | glass | glass | glass | glass | glass | glass | glass | glass | glass | glass | glass | glass |
|---|---|---|---|---|---|---|---|---|---|---|---|---|---|
| | $P_2O_5$ (mole %) | 60.5 | 60.5 | 48.0 | 48.5 | 65.0 | 65.0 | 56.5 | 56.0 | 48.0 | 48.5 | 64.0 | 64.0 |
| | $Al_2O_3$ (mole %) | 8.2 | 8.7 | 9.0 | 9.0 | 16.0 | 16.0 | 12.0 | 12.0 | 9.0 | 9.0 | 15.0 | 15.0 |
| | $SiO_2$ (mole %) | — | — | — | — | — | — | — | — | — | — | — | — |
| | $B_2O_3$ (mole %) | — | — | — | — | — | — | — | — | — | — | — | — |
| $R'_2O$ | $Li_2O$ (mole %) | — | — | — | — | — | — | — | — | — | — | — | — |
| | $Na_2O$ (mole %) | — | — | — | — | 15.0 | 15.0 | — | — | — | — | 15.0 | 15.0 |
| | $K_2O$ (mole %) | 16.4 | 16.4 | 10.0 | 10.0 | — | — | 16.0 | 16.0 | 17.0 | 15.0 | — | — |
| | MgO (mole %) | 2.0 | 2.0 | — | — | — | — | 2.0 | 2.0 | — | — | — | — |
| | CaO (mole %) | — | — | — | — | 3.5 | 4.0 | — | — | — | — | — | — |
| $R''O$ | BaO (mole %) | 12.0 | 12.0 | 31.8 | 32.5 | — | — | 11.5 | 14.0 | 24.0 | 27.5 | — | — |
| | PbO (mole %) | — | — | — | — | — | — | — | — | — | — | — | 2.0 |
| | SrO (mole %) | — | — | — | — | — | — | — | — | — | — | 4.0 | 4.0 |
| | ZnO (mole %) | — | — | — | — | — | — | — | — | — | — | — | — |
| | $Nd_2O_3$ (mole %) | 0.5 | — | 1.2 | — | 0.5 | — | 2.0 | — | 1.5 | — | 1.0 | — |
| | $Y_2O_3$ (mole %) | — | — | — | — | — | — | — | — | — | — | — | — |
| | $TiO_2$ (mole %) | — | — | — | — | — | — | — | — | — | — | — | — |
| | $Nb_2O_5$ (mole %) | 0.4 | 0.4 | — | — | — | — | — | — | 0.5 | — | — | — |
| | $La_2O_3$ (mole %) | — | — | — | — | — | — | — | — | — | — | — | — |
| | $ZrO_2$ (mole %) | — | — | — | — | — | — | — | — | — | — | 1.0 | — |
| | $Ta_2O_5$ (mole %) | — | — | — | — | — | — | — | — | — | — | — | — |
| | $R'_2O$ (mole %) | 16.4 | 16.4 | 10.0 | 10.0 | 15.0 | 15.0 | 16.0 | 16.0 | 17.0 | 15.0 | 15.0 | 15.0 |
| | $R''O$ (mole %) | 14.0 | 14.0 | 31.8 | 32.5 | 3.5 | 4.0 | 13.5 | 16.0 | 24.0 | 27.5 | 4.0 | 6.0 |
| | $R''O + R'_2O$ (mole %) | 30.4 | 30.4 | 41.8 | 42.5 | 18.5 | 19.0 | 29.5 | 32.0 | 41.0 | 42.5 | 19.0 | 21.0 |
| Stimulated emission cross section ($10^{-20}$ cm$^2$) | | 4.2 | — | 3.8 | — | 4.0 | — | 4.2 | — | 3.8 | — | 4.2 | — |
| Fluorescence life time (μsec) | | 315 | — | 315 | — | 400 | — | 270 | — | 300 | — | 315 | — |
| Fiber diameter (μm) | | 80 | | 120 | | 85 | | 121 | | 100 | | 80 | |
| Core diameter (μm) | | 5 | | 4 | | 6 | | 6 | | 4 | | 6 | |
| Core glass refractive index | | 1.521 | | 1.560 | | 1.503 | | 1.537 | | 1.548 | | 1.510 | |
| Numerical aperture | | 0.114 | | 0.125 | | 0.103 | | 0.11 | | 0.136 | | 0.103 | |
| Normalized frequency (1.054 μm) | | 1.70 | | 1.49 | | 1.84 | | 1.97 | | 1.62 | | 1.84 | |

| | | Examples | | | | | | | | | |
|---|---|---|---|---|---|---|---|---|---|---|---|
| | | 13 | | 14 | | 15 | | 16 | | 17 | |
| | | Core glass | Clad glass | Core glass | Clad glass | Core glass | Clad glass | Core glass | Clad glass | Core glass | Clad glass |
| | $P_2O_5$ (mole %) | 56.5 | 56.5 | 48.0 | 48.4 | 64.0 | 64.0 | 56.5 | 57.0 | 56.7 | 52.7 |
| | $Al_2O_3$ (mole %) | 12.0 | 12.0 | 9.0 | 9.0 | 15.0 | 15.0 | 12.0 | 12.0 | 13.1 | 12.1 |
| | $SiO_2$ (mole %) | — | — | — | — | — | — | — | — | 2.0 | — |
| | $B_2O_3$ (mole %) | — | — | — | — | — | — | — | — | — | 7.0 |
| $R'_2O$ | $Li_2O$ (mole %) | — | — | — | — | — | — | — | — | — | — |
| | $Na_2O$ (mole %) | — | — | — | — | 15.0 | 15.2 | — | — | — | — |
| | $K_2O$ (mole %) | 15.0 | 15.0 | 25.0 | 25.0 | — | — | 16.0 | 16.0 | 16.6 | 16.6 |
| | MgO (mole %) | 2.0 | — | — | — | — | — | 2.0 | 2.0 | — | — |
| | CaO (mole %) | — | — | — | — | 3.5 | 3.3 | — | — | — | — |
| $R''O$ | BaO (mole %) | 11.0 | 16.5 | 10.0 | 10.0 | — | — | 10.5 | 10.5 | 10.5 | 11.6 |
| | PbO (mole %) | — | — | — | — | — | — | — | — | — | — |
| | SrO (mole %) | — | — | — | — | — | — | — | — | — | — |
| | ZnO (mole %) | — | — | 3.0 | 3.0 | — | — | — | — | — | — |
| | $Nd_2O_3$ (mole %) | 1.5 | — | 5.0 | — | 2.5 | — | 3.0 | — | 1.1 | — |
| | $Y_2O_3$ (mole %) | — | — | — | — | — | 2.5 | — | 2.0 | — | — |
| | $TiO_2$ (mole %) | — | — | — | — | — | — | — | 0.5 | — | — |
| | $Nb_2O_5$ (mole %) | — | — | — | — | — | — | — | — | — | — |
| | $La_2O_3$ (mole %) | — | — | — | 4.6 | — | — | — | — | — | — |
| | $ZrO_2$ (mole %) | — | — | — | — | — | — | — | — | — | — |
| | $Ta_2O_5$ (mole %) | 2.0 | — | — | — | — | — | — | — | — | — |
| | $R'_2O$ (mole %) | 15.0 | 15.0 | 25.0 | 25.0 | 15.0 | 15.2 | 16.0 | 16.0 | 16.6 | 16.6 |
| | $R''O$ (mole %) | 13.0 | 16.5 | 13.0 | 13.0 | 3.5 | 3.3 | 12.5 | 12.5 | 10.5 | 11.6 |
| | $R''O + R'_2O$ (mole %) | 28.0 | 31.5 | 38.0 | 38.0 | 18.5 | 18.5 | 28.5 | 28.5 | 27.1 | 28.2 |
| Stimulated emission cross section ($10^{-20}$ cm$^2$) | | 4.2 | — | 3.7 | — | 4.1 | — | 4.1 | — | 4.2 | — |
| Fluorescence life time (μsec) | | 300 | — | 100 | — | 250 | — | 150 | — | 315 | — |
| Fiber diameter (μm) | | 125 | | 100 | | 150 | | 80 | | 130 | |
| Core diameter (μm) | | 8 | | 8 | | 6 | | 4 | | 6 | |
| Core glass refractive index | | 1.540 | | 1.535 | | 1.531 | | 1.549 | | 1.511 | |
| Numerical aperture | | 0.091 | | 0.088 | | 0.113 | | 0.139 | | 0.110 | |
| Normalized frequency (1.054 μm) | | 2.17 | | 2.09 | | 2.03 | | 1.65 | | 1.97 | |

Notes:
The fibers of Examples 1-6 are included in the fiber IV mentioned previously.
The fiber of Example 7 is included in the fiber IV mentioned previously.
The fibers of Examples 8-10 are included in the fiber I mentioned previously.
The fibers of Examples 11-12 are included in the fiber II mentioned previously.
The fiber of Example 13 is included in the fiber II mentioned previously.
The fibers of Examples 14-16 are included in the fiber III mentioned previously.
The fiber of Example 17 is included in the fiber IV mentioned previously.

The laser glass fiber of the present invention shows excellent oscillation characteristics even at a short fiber length, as compared with the conventional silica laser fiber. Therefore, it enables production of a compact laser oscillator of high performance which is expected to be used as, for example, a light source for fiber systems. Further, the laser glass fiber of the present invention, having an excellent light amplification characteristic, is expected to be also used as a light amplifier.

In the present invention, there is used, as the clad glass, a phosphate glass having thermal properties similar to those of the core glass, which enables production of a phosphate laser glass fiber. Therefore, the present invention also has a technical merit of being able to mass-produce a long phosphate laser glass fiber of good optical properties.

The above-described embodiments are just examples of the present invention, and therefore, it will be apparent for those skilled in the art that many modifications and variations may be made without departing from the scope of the present invention.

What is claimed is:

1. A laser glass fiber comprising:
   (a) a phosphate laser glass as a core glass, containing, as essential components, 45–70 mole % of $P_2O_5$, 4–20 mole % of $Al_2O_3$, 0.–35 mole % of R″O, wherein R″O is at least one member selected from the group consisting of MgO, CaO, BaO, PbO, SrO and ZnO, 0–30 mole % of $R'_2O$, wherein $R'_2O$ is at least one member selected from the group consisting of $Li_2O$, $Na_2O$ and $K_2O$, the sum of R″O and $R'_2O$ being 4–45 mole %, and 0.1–6 mole % of $Nd_2O_3$; and
   (b) a phosphate glass as a clad glass for the core glass, having a refractive index lower than that of the core glass and containing, as essential components, 45–70 mole % of $P_2O_5$, 4–20 mole % of $Al_2O_3$, 0–35 mole % of R″O and 0–30 mole % of $R'_2O$, the sum of R″O and $R'_2O$ being 4–45 mole %; said laser glass fiber giving single mode oscillation at a lasing wavelength of 1.054 μm.

2. A laser glass fiber according to claim 1, wherein the core glass contains, in addition to said essential components, at least one member selected from the group consisting of (c) 20 mole % or below of $SiO_2$ and (d) 15 mole % or below of at least one member selected from the group consisting of $Y_2O_3$, $La_2O_3$, $TiO_2$, $ZrO_2$, $Nb_2O_5$ and $Ta_2O_5$, as optional components.

3. A laser glass fiber according to claim 1, wherein the clad glass contains, in addition to said essential components, at least one member selected from the group consisting of 20 mole % or below of $Si_2O$; 5 mole % or below of at least one metal oxide selected from the group consisting of $Y_2O_3$, $La_2O_3$, $TiO_2$, $ZrO_2$, $Nb_2O_5$ and $Ta_2O_5$; and 13 mole % or below of $B_2O_3$, as optional components.

4. A laser glass fiber according to claim 1, wherein the core glass contains, in addition to said essential components, at least one member selected from the group consisting of (c) 20 mole % or below of $SiO_2$ and (d) 15 mole % or below at least one member selected from the group consisting of $Y_2O_3$, $La_2O_3$, $TiO_2$, $ZrO_2$, $Nb_2O_5$ and $Ta_2O_5$, as optional components, and the clad glass contains, in addition to said essential components, at least one member selected from the group consisting of 20 mole % or below of $SiO_2$; 5 mole % or below of at least one metal oxide selected from the group consisting of $Y_2O_3$, $La_2O_3$, $TiO_2$, $ZrO_2$, $Nb_2O_5$ and $Ta_2O_5$; and 13 mole % or below of $B_2O_3$, as optional components.

* * * * *